July 16, 1963  M. SALWASSER ETAL  3,097,577
CASING MACHINE
Original Filed Sept. 17, 1960　　　　　　　　　　7 Sheets-Sheet 1

INVENTOR.
MELVIN SALWASSER
LESLIE F. SALWASSER

INVENTOR.
MELVIN SALWASSER
LESLIE F. SALWASSER

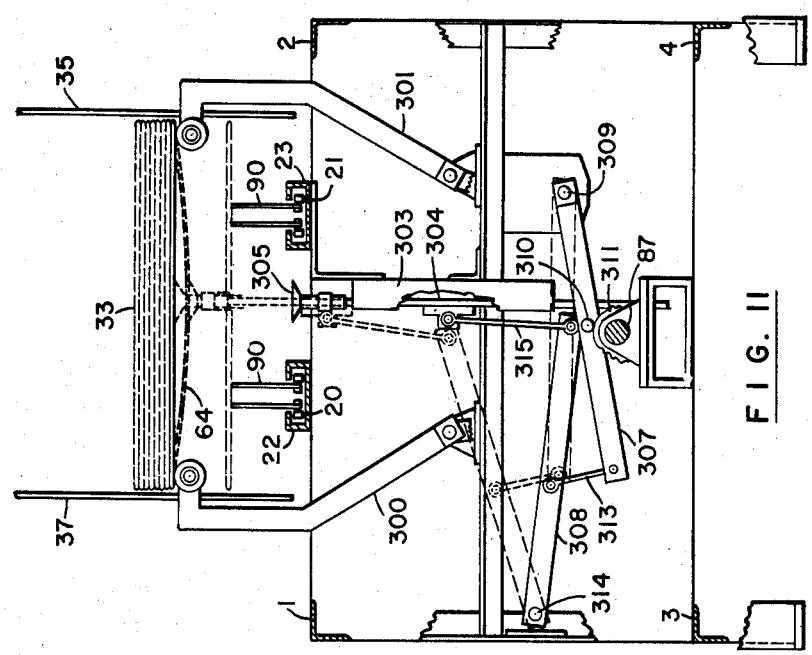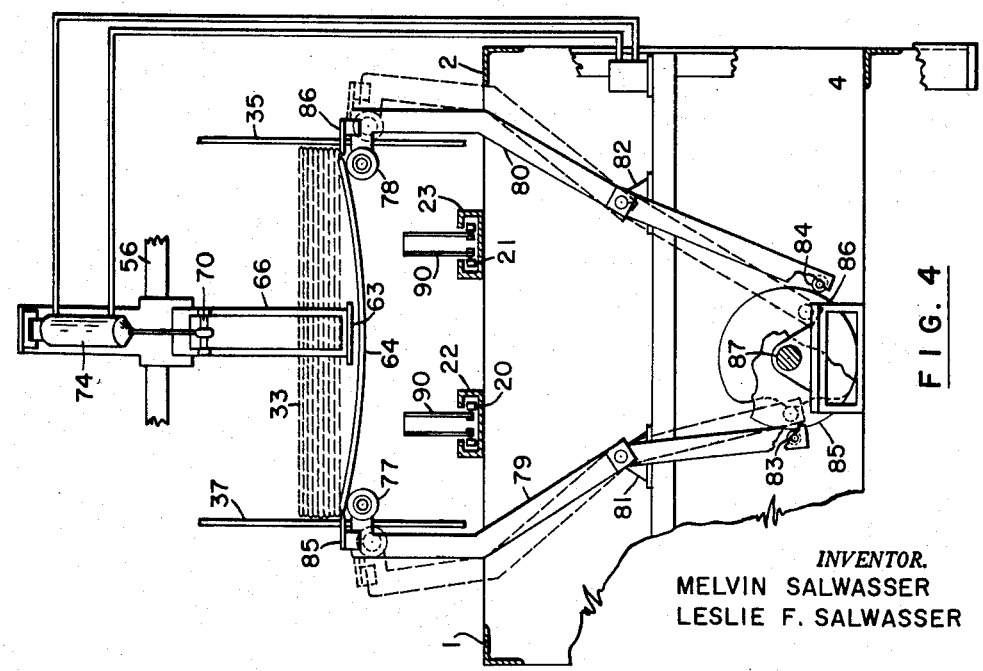

July 16, 1963 M. SALWASSER ETAL 3,097,577
CASING MACHINE
Original Filed Sept. 17, 1960 7 Sheets-Sheet 5

*INVENTOR.*
MELVIN SALWASSER
LESLIE F. SALWASSER

INVENTOR.
MELVIN SALWASSER
LESLIE F. SALWASSER

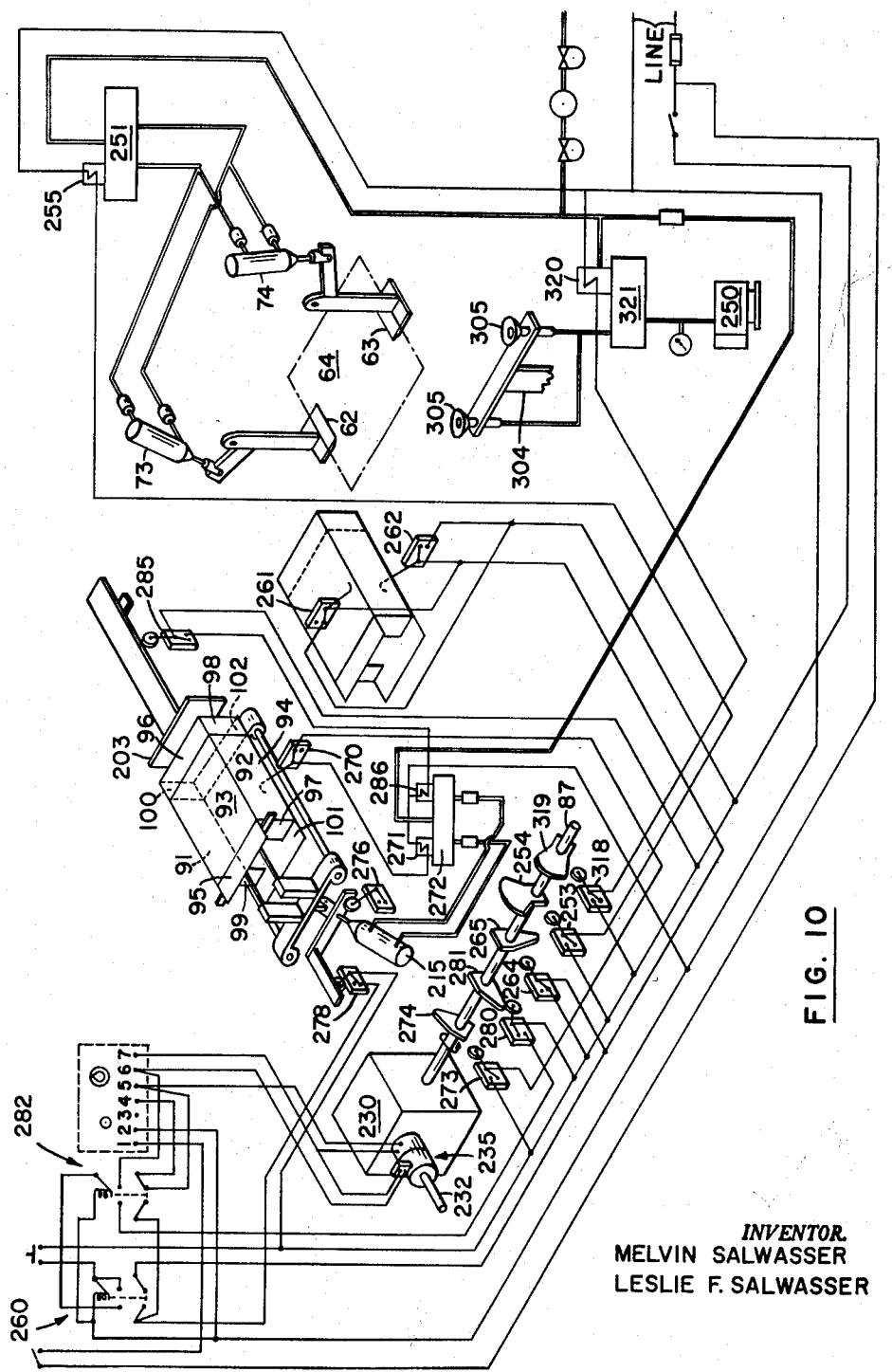

000000000000000000000000000000000000000000000000000000000000000000000000000000000000000000000000000000000000000000000000000000000000000000000000000000000000000000000000000000000000# United States Patent Office 3,097,577
Patented July 16, 1963

3,097,577
CASING MACHINE
Melvin Salwasser, P.O. Box 101, and Leslie F. Salwasser, 49 Jefferson St., both of Reedley, Calif.
Original application Sept. 17, 1960, Ser. No. 49,543. Divided and this application Aug. 8, 1961, Ser. No. 130,012
4 Claims. (Cl. 93—53)

This invention relates to an apparatus for filling cases with a plurality of cartons or like contents and more particularly to an apparatus which automatically opens the cases from their flat collapsed condition and thereafter fills and closes them. This is a division of application Serial No. 49,543, filed September 17, 1960.

The invention also includes a novel method for gravity feeding a stack of sheets such as a stack of collapsed cartons in an efficient and effective manner.

The main object of the invention is therefore the provision of a method and apparatus for automatically opening a flat collapsed case and filling and closing the same.

Other objects and advantages will be apparent from the following specification and from the attached drawings.

FIG. 4 is a vertical cross section taken along lines 4—4 of FIG. 3 showing the means for feeding the flat cases from the magazine.

FIG. 10 is a schematic perspective showing the wiring and piping arrangement.

FIG. 11 is a section similar to FIG. 4 but showing a modification of the means for down feeding the flat cases.

The invention generally comprises a frame comprising a pair of opposite upper longitudinally extending angle bars 1, 2 (FIG. 1), a pair of opposite lower longitudinally extending angle bars 3, 4 (FIG. 9), upper end angles 5, 6, and lower end angles 7, 8. Said frame angles are supported by vertical angles 9–12 at the four corners of the frame.

Figure 1:
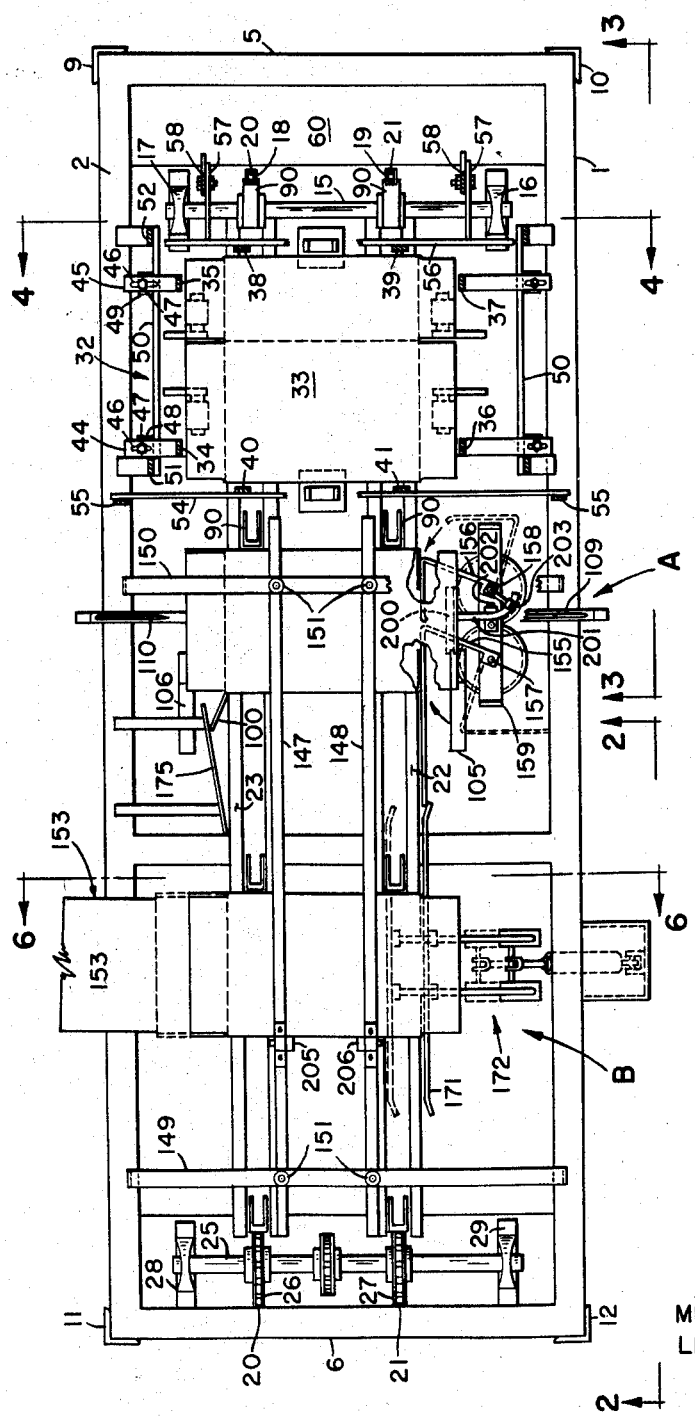
FIG. 1 is a top plan view of the apparatus of the present invention with portions broken away for clarity.

Adjacent one end of the frame is an idler shaft 15 (FIGS. 1, 3) extending transversely of the frame and supported in bearings 16, 17 (FIG. 1). Said shaft 15 carries a pair of sprocket wheels 18, 19 which in turn support a pair of chains 20, 21. The upper runs of chains 20, 21 are retained within channel members 22, 23 on which the cases are adapted to be moved.

At the opposite end of the frame is a driving shaft 25 provided with sprockets 26, 27 and supported in bearings 28, 29. The method of driving shaft 25 will subsequently be described.

Arranged above the frame and adjacent the idler shaft 15 is a magazine generally designated 32 which is adapted to contain a stack 33 of flat collapsed cartons. The rectangular magazine is defined by a pair of vertically extending flat bars 34, 35 (FIG. 1) on one side of the magazine space. Similar flat bars 36, 37 are disposed in a corresponding manner on the opposite side of the magazine. The rear side of the magazine is defined by a pair of vertically extending flat bars 38, 39 and the front side is defined by a similar pair of flat bars 40, 41 (FIG. 1). Flat bar guides 34, 35 are provided with one or more horizontally extending support bars 44, 45 provided with elongated holes 46 for adjustable securement by bolts 47 to lugs 48, 49 carried by longitudinally extending bars 50. Bars 50 may be secured in any convenient manner to the frame as, for example, by vertical flat bars 51, 52 fixedly secured as by welding to frame angle bar 2. The opposite flat bars 36, 37 which cooperate with flat bars 34, 35 are adjustably positioned in a similar manner as flat bars 34, 35 so that the magazine 32 may be employed for cases of different sizes.

The forward flat bars 40, 41 which define the forward end of magazine 32 may be fixedly secured to one or more horizontally extending flat bars 54 which in turn are secured to vertically disposed members 55 rising upwardly from frame members 1, 2.

Similarly the rear flat bars 38, 39 which define the rear end of magazine 32 are fastened to one or more transverse bars 56 which in turn are provided with rearwardly extending support bars 57, formed with elongated holes for adjustable securement to vertical posts 58. Said posts may be fixed in any convenient manner as by welding to a top plate 60 secured to the flanges of the frame angles 1, 2, 5.

From the above description it will be apparent that an adjustable magazine is provided for cases of different sizes.

Figure 3:
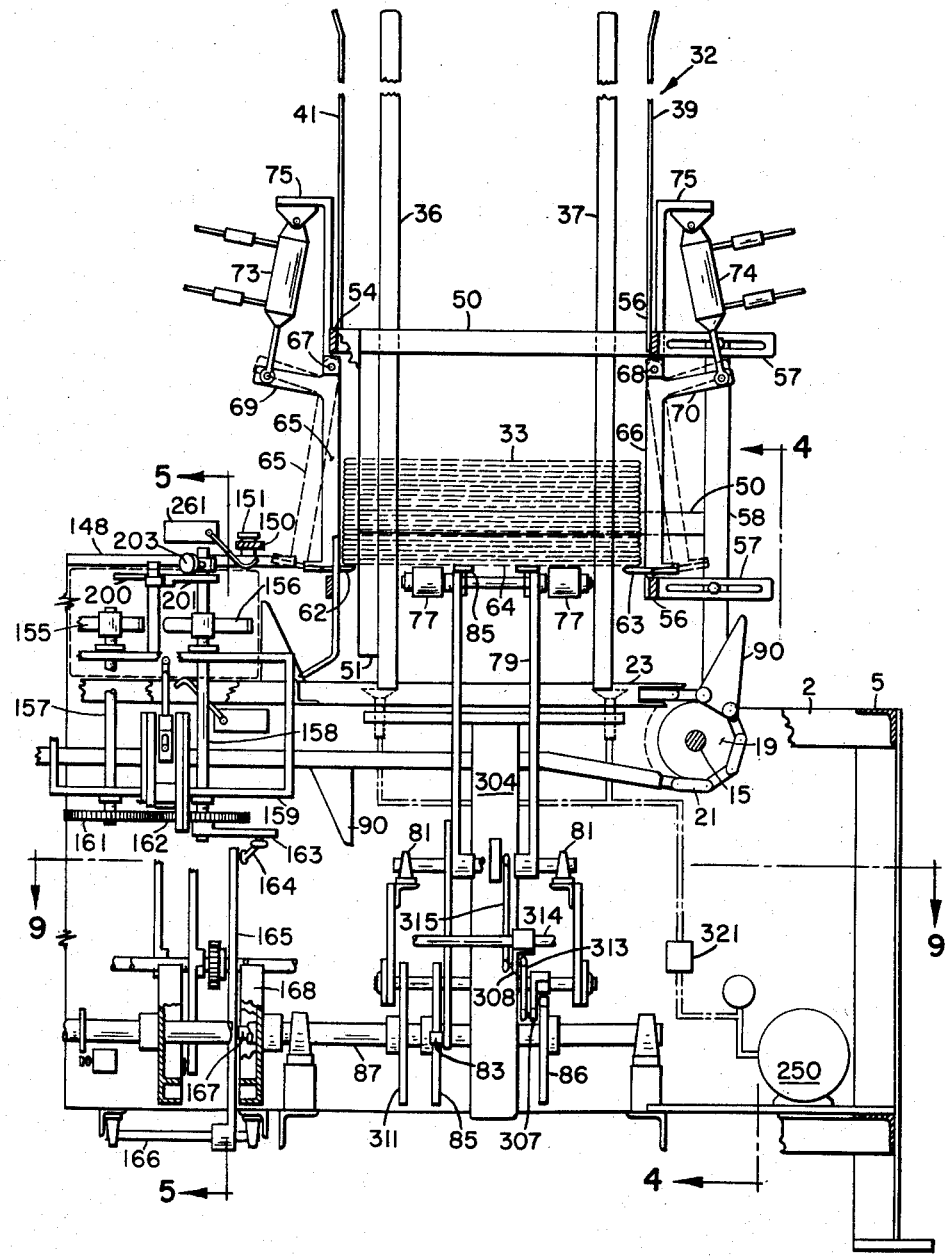
FIG. 3 is a continuation of FIG. 2 showing the other end of the apparatus.

The method and apparatus for feeding the cases from stack 33 is best seen in FIGS. 3, 4. The stack 33 is normally supported by means of a pair of support plates 62, 63 which, as is seen in FIG. 3, engage the bottom case 64 at the forward and rear edges respectively of the same relative to the direction of travel of the conveyor. Said plates 62, 63 are rigidly secured to the lower ends of a pair of opposed levers 65, 66 (FIG. 3) which in turn are swingably secured at their upper ends on pivots 67, 68 carried by the upper cross bars 54, 56. At right angles to levers 65, 66 are a pair of integral actuating arms 69, 70 which are adapted to be swung by a pair of hydraulic cylinders 73, 74 which in turn are pivotally connected to brackets 75 also carried by bars 54, 56.

The function of cylinders 73, 74 is to swing support plates 62, 63 outwardly from the full line positions to the dotted line positions so that the bottom case may drop downwardly by gravity. The means for holding the stack as bottom case 64 drops is best seen in FIG. 4. Said means comprises a pair of rollers 77 on one side of the stack (FIG. 3) and a similar pair of rollers 78 on the other side of the stack. Rollers 77 are rotatably supported on the upper end of a generally vertically disposed arm 79 and rollers 78 are similarly supported on an arm 80. Arms 79, 80 are swingably supported intermediate their ends on bearings 81, 82 and are provided at their lower ends with cam follower rollers 83, 84 which are respectively engaged by a pair of radial cams 85, 86 carried by a rotating cam shaft 87. The means for driving shaft 87 will subsequently be described but at this point it may be noted that the shape of cams 85, 86 is such that arms 79, 80 swing together from the full line position to the dotted line position and vice versa. Hydraulic cylinders 73, 74 and cams 85, 86 are timed so that support plates 62, 63 support the stack 33 when rollers 77, 78 are in their outer dotted positions of FIG. 4.

In operation, as arms 79, 80 swing inwardly, and rollers 77, 78 engage the underside of bottom case 64 of stack 33, support plates 62, 63 withdraw to the dotted line position of FIG. 3 Secured to the arms 79, 80 are horizontally disposed compression plates 85, 86 (FIG. 4) which are spaced slightly upward from the upper periphery of rollers 77, 78, so that upon further inward movement of rollers 77, 78 (after support plates 62, 63 have been retracted) plates 85, 86 exert opposite inwardly directed forces on the opposite side edges of case 64. Such compressive forces bend bottom case 64 so that it bows downwardly; upward bowing, of course, being prevented by stack 33. Bottom case 64 is shown in its bowed position in FIG. 4 and it will be apparent that support plates 62, 63 may be swung inwardly by cylinders 73, 74 to engage the next-to-the-bottom case as rollers 77, 78 are retracted to permit the bottom case 64 to fall downwardly by gravity.

The bottom case which is fed downwardly in the above-described manner falls onto the chain receiving channels 22, 23 (FIG. 4). Lateral shifting of the case is, of course, prevented by the vertical guides 36, 37 on one side and the guides 34, 35 on the other side.

For the purpose of progressing the cases along the length of the conveyor, cleats 90 (FIG. 3) are secured to chains 20, 21 at spaced points along the length of the latter. Said cleats engage the rearwardly directed edges of each case and move it to a case opening station indicated at A in FIG. 1 at which station the conveyor momentarily stops in a manner that will subsequently be described.

The particular case shown in the drawings to illustrate the invention comprises a pair of opposed sidewalls 91, 92; the leading sidewall being designated 91 relative to the path of travel on the conveyor, and the trailing sidewall being designated 92 (FIG. 10). A somewhat larger pair of opposed sidewalls 93, 94 at right angles to sidewalls 91, 92 are disposed with sidewall 93 uppermost and sidewall 94 lowermost and engaging chain guides 22, 23.

Figure 6:
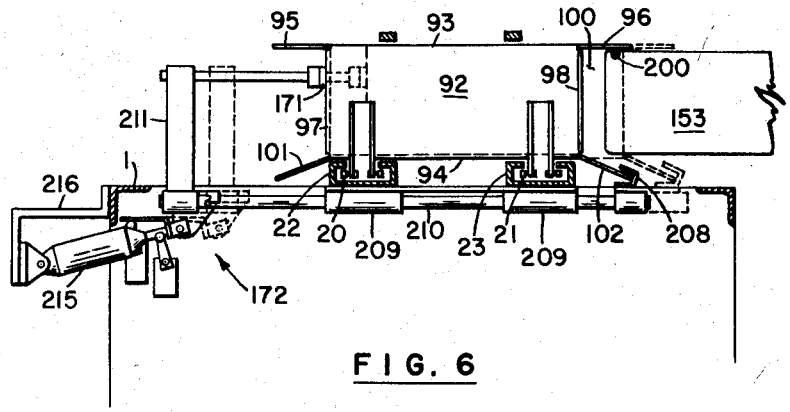
FIG. 6 is a cross section showing the means for filling the case with cartons.

For the purpose of forming the top and bottom of the case, the sidewalls are provided with flaps which are adapted to be folded to positions at right angles to their associated sidewalls. Thus flaps 95, 96 are integrally secured to upper sidewall 93 along crease lines (FIG. 10). and flaps 97, 98 are similarly secured to trailing sidewall 92. The leading sidewall 91 is provided with flaps 99, 100 (FIGS. 1, 10) and the bottom sidewall is provided with flaps 101, 102 (FIGS. 6).

Since the contents of the case will be loaded through the open end of the case adjacent flaps 96, 98, 100, 102, said flaps will be considered as forming the top of the case and flaps 95, 97, 99, 101 as forming the bottom of the case.

Figure 8:
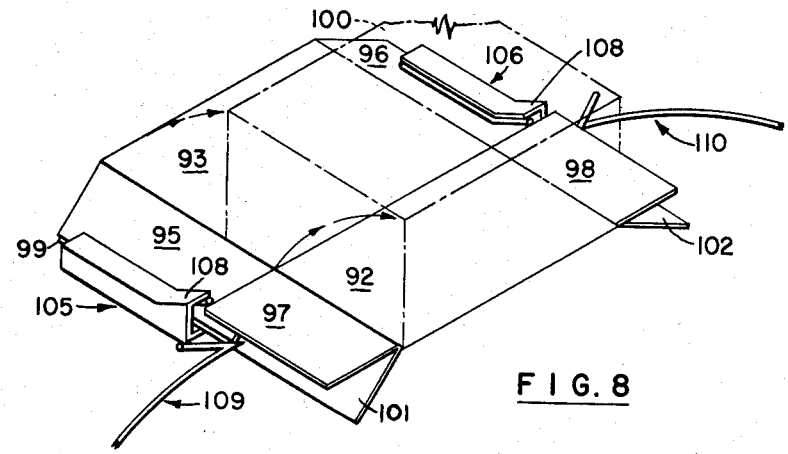
FIG. 8 is a perspective showing schematically the manner in which the case is opened.

The first step in opening the case is best seen in FIG. 8 wherein a pair of inwardly opening channels 105, 106 are provided alongside the path of travel of the case for receiving therein the flaps 95, 99 on one side and flaps 96, 100 on the other side. The rear ends of the upper flanges of channels 105, 106 are flared upwardly as indicated at 108 so as to depress the leading flaps as the case approaches the opening station A. The depression of said flaps tends to spread apart flaps 97, 101 on the one side (FIG. 8) and flaps 98, 102 on the other side since trailing flaps 97, 98 are free to move upwardly slightly. When the case is in this position (FIG. 8) a pair of spreading members 109, 110 are moved into the space between the trailing flaps and between the trailing sidewall 92 and bottom sidewall 94. Since the case is held against rearward movement by cleats 90 on conveyor chains 20, 21 the effect of spreading members 109, 110 is to pull flaps 95, 96 slightly out of guides 105, 106.

Figure 5:
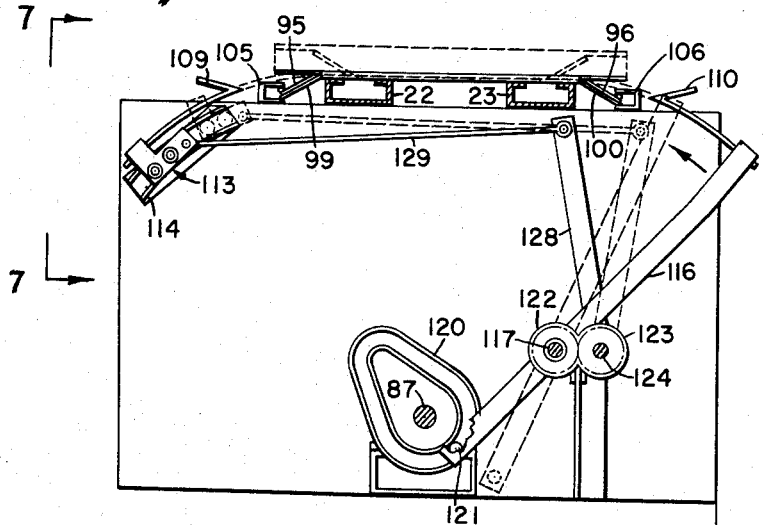
FIG. 5 is a cross section taken along lines 5—5 of FIG. 3 showing the means for spreading apart the opposite sides of the flat case.

The means for actuating spreading members 109, 110 is best seen in FIG. 5. Spreading member 109 is mounted in a wheeled carriage 113 which in turn is received in a track 114 arranged so as to permit spreading member 109 to move from the outer full line position to the inner dotted line position for starting the case opening step. Spreading member 110 is mounted on one end of an actuating lever 116 which is mounted on a shaft 117 (FIG. 5, 9) rotatably supported on a pair of bearings 118, 119 carried by the frame.

Figure 9:
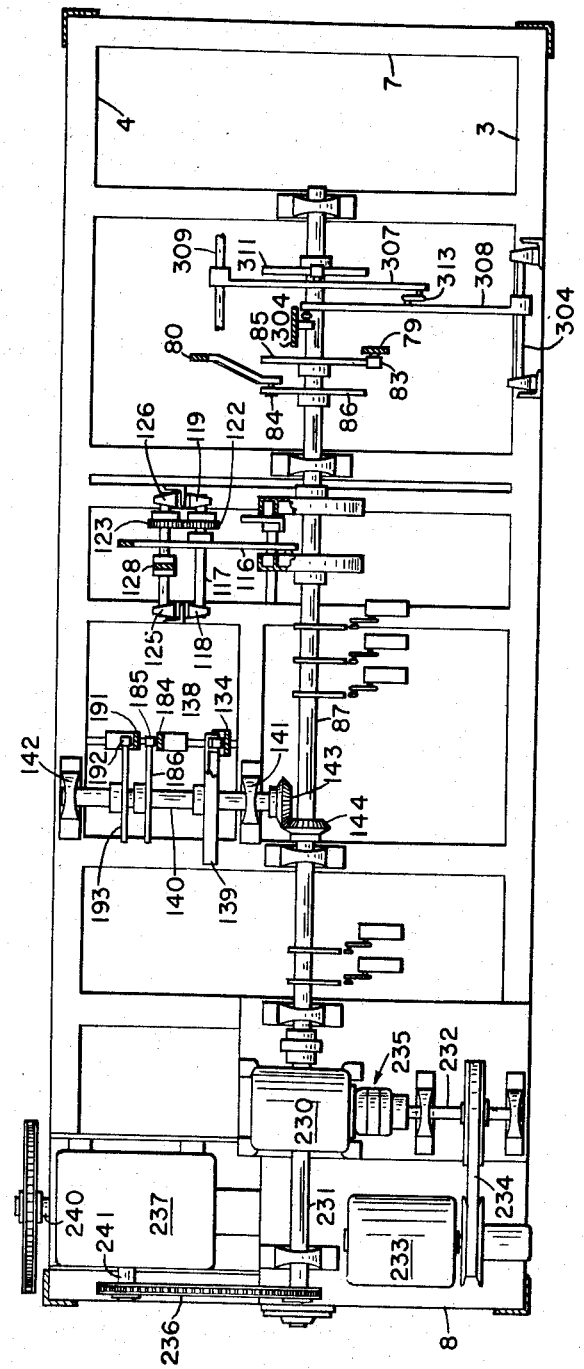
FIG. 9 is a horizontal section of the apparatus showing the main cam shaft and associated driving equipment.

The above-described movement of spreader 110 is achieved through a face cam 120 carried by cam shaft 87 and which cooperates with a follower roller 121 on lever 116. To reproduce the same motion on both spreading members 109, 110 a gear 122 is secured to shaft 117 and said gear meshes with a similar gear 123 mounted on shaft 124 supported in bearings 125, 126, (FIG. 9). Gear 123 supports the lower end of a generally vertically extending arm 128 which is connected at its upper end to a rod 129 extending between said arm and the carriage 113. By this structure spreading members 109, 110 move simultaneously into and out of spreading relations with the flat case as seen in FIG. 5.

Figure 2:
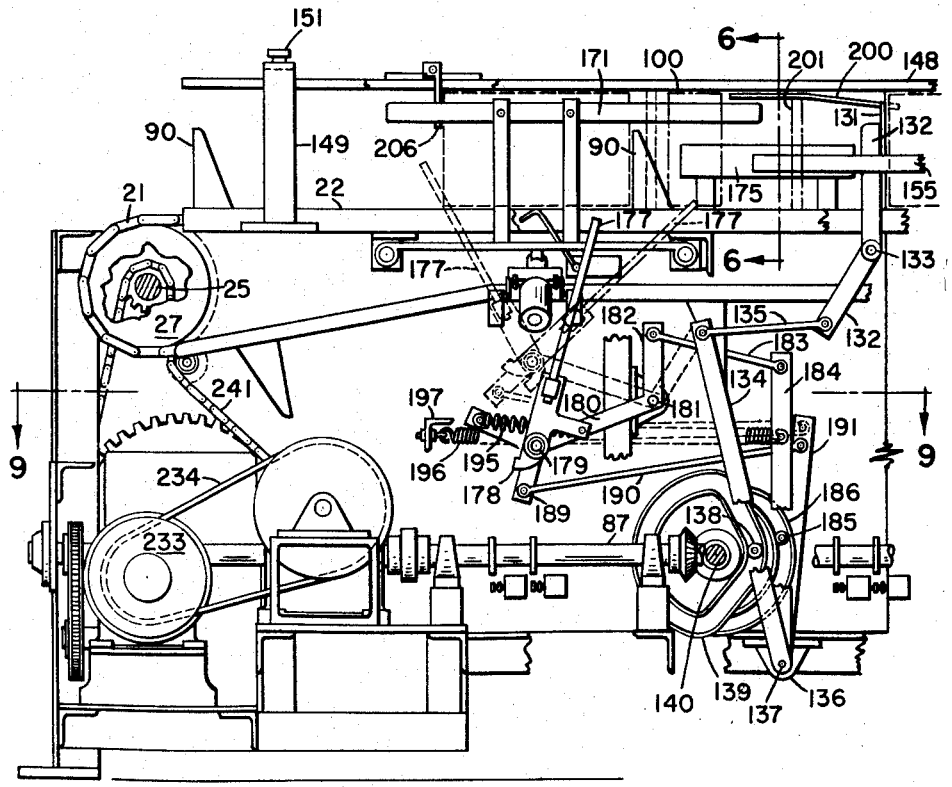
FIG. 2 is a side elevation partly broken away and in section of one end of the apparatus of FIG. 1.
Figure 7:
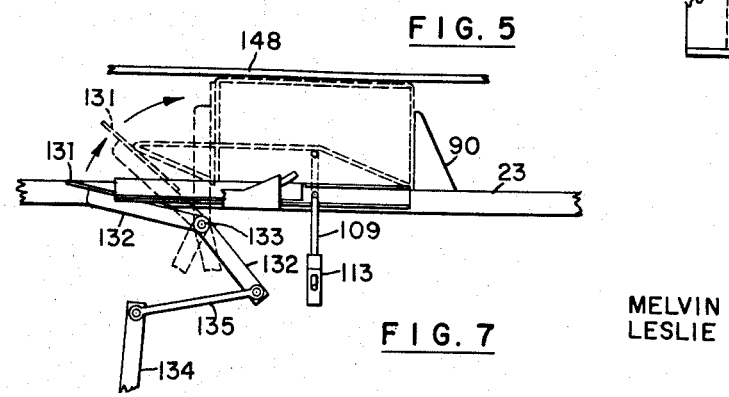
FIG. 7 is a fragmentary longitudinal section of the apparatus showing the operation of the case opening means.

At the same time spreaders 109, 110 commence the opening of the case, the apparatus of FIG. 7 operates to completely open the case. Said apparatus comprises a plate 131 mounted on an arm 132 which in turn is swingably supported intermediate its ends on a pivot 133. The lower end of arm 132 is connected with the upper end of an actuating arm 134 by a rod 135. Said actuating arm 134 is swingable supported at its lower end on a transversely extending shaft 137 secured by brackets 136 to the frame (FIG. 2). Intermediate ends, arm 134 is provided with a follower roller 138 which cooperates with a face cam 139 carried by a transverse auxiliary cam shaft 140. As best seen in FIG. 9 cam shaft 140 is rotatable in bearings 141, 142 carried by the frame and is driven through bevel gears 143, 144 from the main cam shaft 87. Cam 139 is formed so that case opening plate 132 swings from a normal position shown in full line in FIG. 7 to an upright position shown in full lines in FIG. 2. It will be apparent from FIG. 7 that the resistance to rearward movement of the case offered by cleat 90 and the resistance to upward movement of the case offered by spreaders 109, 110 permits plate 131 to swing the flat case from its flattened form into the completely open form shown in FIG. 10. To assist in retaining the case in its opened form, a pair of longitudinally extending hold down guide bars 147, 148 are supported over the conveyor by means of U-shaped supports 149, 150 which in turn are secured to frame members 1, 2. To permit adjustment of said guide bars, the same may be carried in adjustment screws 151 in supports 149, 150.

It will be understood that during forward movement of the case it will be retained in its open position by the conveyor chain guides 22, 23, the conveyor cleats 90 and the hold down guide bars 147, 148, together with bars 155, 156 and 171.

From the case opening station A, the open case progresses to the filling station indicated at B in FIG. 1 at which station a case filling device generally designated 153 fills the case with its contents through the open top thereof. Before the filling operation takes place, however, means is provided for folding the flaps 97, 99 to their inner positions shown in FIG. 10, and in which position said flaps 97, 99 defined the bottom of the case so that the contents may be urged against said flaps during the filling operation.

The means for so folding flaps 97, 99 is at station A and comprises a pair of bent arms 155, 156 supported on a pair of vertically disposed shafts 157, 158 rotatably supported in bearings in an auxiliary frame 159 secured to frame angle 1 (FIG. 3). At their lower ends, shafts 157, 158 are provided with gears 161, 162 respectively for rotating said shafts together. Shaft 158 is provided below gear 162 with a crank arm 163 which in turn is connected by a link 164 with the upper end of an operating arm 165. The operating arm 165 is swingably mounted at its lower end on a shaft 166 and is provided intermediate its ends with a cam follower roller 167 cooperating with a face cam 168 carried by main cam shaft 87. The action of cam 168 swings the upper end of arm 165 back and forth to swing flap folding arms 155, 156 from the dotted line position of FIG. 1 to the full line position. It will be noted that the shape of arms 155, 156 is such that the flaps 97, 99 are folded through 90 degrees and are held in a position at right angles to the sidewalls 91, 92 to which they are attached. Arm 155 remains in its full line position of FIG. 1 while the carton is being moved between stations A, B, and it will be noted that the length of arm 155 is such that it holds the flaps 97, 99 in closed position until said flaps are restrained by a horizontally extending bar 171 (FIGS. 1, 2, 6) carried by a case shifting mechanism generally designated 172. The function of mechanism 172 will subsequently be described.

Before flaps 97, 99 are folded by arms 155, 156 as above described means is provided for raising flap 95 against the urgency of gravity tending to swing it downwardly into the path of said flaps 155, 156. Such means comprises a plate 120 (FIG. 1) secured at one end of an arm 201 which is pivotally supported intermediate its ends as at 202. The end of arm 201 opposite plate 120 is curved to a circular arc as best seen in FIG. 1 and is engaged along its upper side by a roller 203 carried by an extension of the arm 156 which folds flap 97. By this structure, during the initial portion of the swing of arm 156 plate 200 swings upwardly to engage the underside of flap 95 and raise it above flaps 97, 99 as the latter are folded to closed position.

Considering now the open or top end of the case as the latter moves from station A to station B; when the case is raised into its open position, it will be noted from FIG. 8 that the flaps restrained within channels 105, 106 are pulled out of said channels. However, flap 100, which is the leading flap of the open end of the case is prevented from swinging to its normal position by a guide 175 and is held wide open by said guide as the case moves to station B. See FIG. 1. Since guide 175 cannot extend into the case filling station, means must be provided for holding flap 100 in open position until it passes said station. Such means is shown in FIG. 2 and comprises an elongated rod 177 which is swung to the full line position. It will be noted that when the rod is in the full line position it is entirely under the case so as not to interfere with the case filling operation.

Rod 177 is fixed at one end to a plate 178 which is pivotally supported as at 179 to an operating lever 180 which in turn is pivotally supported on pivot 181 fixed to the machine frame. Angularly disposed relative to lever 180 is an integral arm 182 to the end of which is secured a rod 183 connecting said arm to the upper end of an actuating arm 184. Arm 184 is provided with a cam follower roller 185 which cooperates with a radial cam 186 carried by cam shaft 140. It will be noted that when arm 184 swings to the right pivot 179 is swung upwardly to permit rod 177 to engage flap 100.

An extension 189 is provided on plate 178 to permit connecting said plate by rod 190 to the upper end of an actuating arm 191 which is swingably connected at its lower end to shaft 137. A roller 192 (FIG. 9) on arm 191 cooperates with cam 193 on cam shaft 140 to permit said cam 193 to operate arm 191 in the desired manner.

A tension spring 195 connects plate 178 with lever 180 to urge rod 177 in a counterclockwise direction (FIG. 2) to the dotted position of FIG. 2, and a tension spring 196 connecting actuating arm 184 with a frame member 197 urges plate 178 downwardly to the full line position of FIG. 2. It will be apparent from the three positions of rod 177 shown in FIG. 2 that the action of the above-described mechanism is such that rod 177 engages flap 100 before the latter is disengaged from guide 175 and said rod follows said flap until the latter passes station B at which point the flap may be released. Rod 177 then returns to its full line position until the next case starts to move from station A to station B.

The flap 96 which is carried by the upper sidewall 93 must also be prevented from swinging toward its closed position during movement of the case from station A to station B, and this is done by an upwardly and forwardly slanting stationary guide rod 200 which is secured by bar 201 to frame angle 2. It will be noted that, because of the longitudinal extent of flap 96, it passes the filling device 153 before it disengages from guide 200.

The case filling device 153 may take various forms and the particular form thereof is not claimed herein. However for purposes of illustration the portion of the filling device disclosed is the same as the corresponding parts disclosed in United States patent application Serial No. 487,407, filed February 10, 1955, in the name of Salwasser, now Patent No. 2,941,339.

The only portion of said filling device cooperating with the present invention is a loading tube comprising four sheet metal sides forming a chute through which the contents are pushed by a loading ram 203 (FIG. 10). In FIGS. 1, 6, the rectangular loading tube is indicated by 153.

It will be appreciated that great accuracy is required in stopping the case in a position in registration with the filling chute 153. To assist in achieving this accuracy, a pair of spring urged fingers 205, 206 are supported on hold down bars (FIGS. 1, 2). These fingers are urged by a strong spring against a stop so that the same are normally vertically disposed as seen in FIG. 2. However, after the case loading step has been performed, the urgency of the spring may be overcome by the conveyor as it again moves the case forward to the flap closing station.

Referring to FIG. 6 it will be understood that the loading tube or chute 153 is stationary and that leading flap 100 does not interfere with said chute because of the action of rod 177 (FIG. 2) above described. Furthermore, interference between flap 96 and the loading tube 153 by a channel guide 208 which is supported at one end of a carton shifting device generally designated 172. (See FIG. 6.) The purpose of this device is to shift the carton transversely of the path of travel of the conveyor so that the flaps 96, 98, 100, 102 are disposed on the outside of, and in surrounding relation with the open end of loading tube 153. The means for performing this function will now be described:

Secured to the undersides of chain guides 22, 23 are four cylindrical sleeves 209 through which are reciprocably received two guide rods 210 to which the above-noted channel guide 208 is connected. At the opposite ends of guide rods 210 from channel guide 208, the same are provided with an upstanding support member 211 to which are secured the guide bar 171 which holds flaps 97, 99 closed in the manner described above.

Also secured to guide rods 210 is one end of a hydraulic cylinder 215 (FIG. 6) which is connected at its other end to a bracket 216 carried by frame member 1. As seen in FIG. 6, as cylinder 215 is extended from the normal position shown in full lines in FIG. 6, it urges guide rods 210 to the right so that bar 171, in engagement with the closed end of the case, positively shifts the case about three inches so that the flaps at the open end surround the sides of the loading tube 153. It will also be apparent from FIG. 6 that as loading ram 203 (FIG. 10) loads the stack of contents into the case such loading movement can be relied on to return the shifting mechanism back to its normal position after the fluid pressure in cylinder 215 has been relieved. During such return movement it will be understood that bar 171 tends to keep the bottom of the case square and channel 208, engaging lower flap 102, assists in this object.

When the loaded carton is again clear of loading chute 153, the conveyor again moves the carton to take it to the flap closing operations. The final steps of closing the case flaps may be done in any conventional fashion as many devices are known for this purpose. For this reason no description is given of these final steps since they do not form a part of the present invention.

The means for driving the conveyor chains 20, 21 and for operating the cam shaft and other devices above referred to will now be described.

The main cam shaft 87 is driven from a right angle gear box 230 which also drives a shaft 231 coaxial with cam shaft 87. The input shaft 232 of gear box 230 is driven from an electric motor 233 through a drive belt 234. The input to the gear box 230 is controlled by an electric clutch and brake assembly 235 on shaft 232 the operation of which will subsequently be described in connection with FIG. 10.

Output shaft 231 of gear box 230 is connected by a chain 236 with an intermittent type drive box 237 such as the type commonly known as a "Ferguson." This intermittent drive box is constructed so that its output shaft 240 rotates for only a portion of the time that the input shaft 241 rotates. For example, in the embodiment of the invention disclosed herein the arrangement is such that the output shaft 240 of the intermittent drive box 237 rotates only during the first 150° of each complete rotation of the main cam shaft 87. The reason for this arrangement is that the output shaft 240 is connected by sprocket chain 241 (FIG. 2) with the driving shaft 25 of the conveyor and it is desired to employ the first portion of each rotation of cam shaft 87 to translate the cases from one station to the next and to have the conveyor stopped while the functions represented by the remaining portion of the rotation of the cam shaft are being performed.

Referring now to the general operation of the device and with reference to FIG. 10 a vacuum pump 250 may be provided for actuating cylinders 73, 74 which control the downfeeding of the cases from the stack 33 (FIG. 4). The lowermost case 64 is indicated in FIG. 10 and it will be seen that as vacuum is applied to cylinders 73, 74 through solenoid actuated valve 251 the support plates 62, 63 swing outwardly to release bottom case 64. The actuation of valve 251 is achieved by means of a switch 253 engaged by cam 254 on cam shaft 87 and energizing solenoid 255 of valve 251. In this manner the lower case may be fed into the conveyor in proper timed relation to the other steps which are performed by the apparatus during one rotation of cam shaft 87.

After the case has been carried to station A by the conveyor rotation of cam shaft 87 causes the case opening operation to be carried on as hereinbefore described. As a safety measure, and to stop the cam shaft 87 in the event a properly opened case is not at station A, a relay 260 is provided which is actuatable by switch 261 in its open position. In parallel with switch 261 is a similar switch 262 which, when open, merely indicates the presence of a case at station A. It will be noted from FIG. 10 that if no case is at station A the clutch 235 will not be disengaged and the cam shaft 87 will continue to rotate; but if a case at station A has not been properly opened the clutch 235 will be disengaged by the action of switch 264 opened by cam 265 on cam shaft 87. Cam 265 is set so as to acbtuate switch 264 immediately after the case opening plate 131 has opened the case. In other words unless switch 261 is closed by a properly opened case at the correct time in the cycle the relay 260 will operate to disengage clutch 235 and stop the machine.

At station B the case causes switch 270 to close the circuit of solenoid 271 of valve 272 to advance cylinder 215 and shift the case in the manner described above in connection with FIG. 6. However, switch 270 is in series with a switch 273 actuated by cam 274 on cam shaft 87 so that cylinder 215 is not advanced until the proper predetermined time relative to the other operations.

To prevent the case loading device from discharging a load except when a properly opened case is available at station B an interlock must be provided between the case positioning means of the present invention and whatever loading device is provided. This interlock may be actuated by a switch 276 connected with the case loading means in any desired manner and actuated by the shifting movement of the cylinder 215.

The case positioning and shifting means 172 (FIG. 6) serves to actuate a switch 278 to open the clutch circuit when said positioning means has shifted the case laterally toward the case loader. However, to permit time for the case to be loaded a switch 280 is provided, actuated by cam 281 on cam shaft 87 and adapted to actuate an opener relay 282 to stop the machine just before the conveyor chain starts to move.

It will be understood of course in this connection that the automatic loading device which fills the case may, for various reasons, not be provided with a complete load at the time the case is ready to be filled. It is therefore necessary that means such as switch 280 be provided to disengage the clutch 235 if the filling operation has not been performed at a predetermined point in the cycle of cam shaft 87.

As the case loading ram 203 advances toward the end of its stroke it actuates switch 285 which in turn energizes solenoid 286 of valve 272 and reverses the direction of cylinder 215. When the case positioner is shifted back to its original position switch 278 is again activated completing the circuit to the clutch relay and holding the clutch engaged. Under normal circumstances therefore the machine will not stop between cycles because switch 278 will be closed before switch 280 is opened.

The above described apparatus exemplifies the preferred embodiment of the invention and provides a completely automatic case opening and filling machine. In some instances however it may be preferable to add to the mechanism of FIG. 4 additional vacuum actuated means to assist in the downfeeding of the flat cases from the magazine 32. Although such additional means is shown in combination with structure already described it will be understood that the mechanical feeding operation already described is sufficient in some instances. In other cases the vacuum actuated means may be sufficient by itself and in still other situations the combination of mechanical feed and vacuum feed as shown in FIGS. 3, 4 and 10 may be employed.

When employed by itself the vacuum actuated case feeding means is shown in FIG. 11 wherein the parts that are the same as in FIG. 4 bear the same numerals. In FIG. 11 however, the case supporting arms 300, 301 corresponding to arms 79, 80 of FIG. 4 need not be provided with compression plates such as 85, 86 of FIG. 4 although the actuation of the lower ends of arms 300, 301 is the same as in FIG. 4.

In the vacuum actuated structure of FIG. 11 a vertically extending guide 303 is suitably supported on the machine frame and carries a slide bar 304 to the upper end of which are secured a pair of vacuum cups 305 (FIG. 10) spaced longitudinally of the machine. As best seen in FIG. 11, vacuum cups 305 are raised into engagement with the lowermost case 64 of the stack 33, vacuum is then applied to the cups and on their downward stroke they pull the lowermost case 64 into the dotted line bowed position of FIG. 11 at which point the support plates 62, 63 swing into the space between the lowermost case and the next case. Arms 300, 301 may then be swung outwardly as the vacuum cups 305 continue their downward movement thereby completely releasing the lowermost case so that the same comes to rest on chain guides 22, 23. The vacuum cups 305 of course continue to move below the level of guides 22, 23 so as not to interfere with the forward movement of the case.

The relatively long travel of slide bar 304 required to achieve the above operation may be effected by means of a pair of levers 307, 308 (FIG. 11). One end of lever 307 is pivotally supported on the machine frame as at 309 and vertical swinging of lever 307 is effected by a roller 310 engaging a radial cam 311 on cam shaft 87. The free end of lever 307 is connected by a link 313 with the lever 308 intermediate the ends of the latter. One end each of lever 308 is swingably supported as at 314 to the machine frame and its other end is connected by link 315 to the upper end of the slide bar 304. By this structure at least four times the movement represented by the rise of cam 311 may be transferred to slide bar 304.

Referring to FIG. 10, a switch 318 actuated by cam 319 on cam shaft 87 is employed to energize solenoid 320 on valve 321 to apply vacuum to vacuum cups 305 at the proper predetermined movement to pull the lowermost case downwardly. If desired, the vacuum in cups 305 need not be released until the case rests on chain guides 22, 23 or is very close thereto.

The actuating cylinders are referred to herein as hydraulic but it will be understood that the same operations are involved if air is employed as the medium. Air is preferable in most instances.

The very detailed description herein given of the preferred forms of the invention should not be taken as restrictive thereof as it will be obvious that variations in design will occur to those skilled in the art without departing from the scope of the appended claims.

I claim:

1. In an opening device for a case provided with two pairs of opposed sidewalls hingedly secured together along four fold lines to form a rectangular sleeve open at opposite ends and provided with end flaps hingedly secured to the corresponding ends of said sidewalls to form upper and lower layers of flaps and adapted to be folded at right angles to said sidewalls to close an end of said sleeve, conveyor means for moving said case in a flat condition along a horizontal path of travel with said fold lines at right angles to said path and with said flaps extending outwardly of said ends and in continuation thereof, a flap depressing means at a point along said path engageable with the upper side of the leading portion of said flaps adjacent the free ends thereof for bending both of said layers of said flaps downwardly from the plane of said flat case, whereby the flaps at the trailing portion thereof tend to move apart, spreading means movable from a position laterally offset from said case to a position between said flaps at said trailing portion for spreading the sides of said flat case further apart for partially opening the case, and opening means engageable with the leading portion of said case for swinging the lower leading sidewall upwardly to a vertical position for fully opening said case.

2. A device according to claim 1 wherein said case includes flaps at opposite ends of said sleeve and flap depressing means and spreader means are provided at said opposite ends.

3. In an opening device for a case provided with two pairs of opposed sidewalls hingedly secured together along fold lines to form a rectangular sleeve open at opposite ends, conveyor means for moving said case in a flat condition along a horizontal path of travel with said fold lines extending transversely of said path, said conveyor means including an upstanding pusher element engaging the trailing edge of said flat case for so moving said case, a horizontally extending hold-down bar, means at a point along said path engageable with the leading portion of said case for swinging said case to an open position with one side in abutment with said pusher element and another side in abutment with said bar, a depending finger provided on said bar at a second point along said path, means yieldably holding said finger in a position at right angles to said bar to provide an abutment against which the upper end of said upper leading side is adapted to engage to position and orient said case, and whereby said finger is swung out of the path of said case as the latter is moved farther along said path and past said finger.

4. In an opening device for a case provided with two pairs of opposed sidewalls hingedly secured together along fold lines to form a rectangular sleeve open at opposite ends, conveyor means for moving said case along a horizontal path of travel with said fold lines at right angles to said path and with said case flat to provide a pair of upper sides and a pair of lower sides, flaps hingedly secured to said sidewalls at corresponding ends of the latter and adapted to be folded at right angles to said sidewalls to form an end of the case, flap depressing means at a point along said path engageable with said flaps at a point along the upper side of the upper pair thereof for urging an upper and lower pair of said flaps downwardly from the plane of said flat case, whereby the flaps tend to move apart at another point along the length of the same, spreading means at said other point and movable from a position laterally offset from said case to a position between the upper and lower pairs of flaps for spreading them further apart to partially open the case.

References Cited in the file of this patent

UNITED STATES PATENTS

| | | |
|---|---|---|
| 2,289,820 | Ardell | July 14, 1942 |
| 2,566,951 | Mills | Sept. 4, 1951 |
| 2,612,823 | Woelfer | Oct. 7, 1952 |
| 2,651,896 | Woodruff et al. | Sept. 15, 1953 |
| 2,747,348 | Rose | May 29, 1956 |
| 2,750,856 | Ferguson et al. | June 19, 1956 |
| 2,873,565 | Arneson | Feb. 17, 1959 |
| 2,906,392 | Galloway | Sept. 29, 1959 |
| 2,935,918 | Goss | May 10, 1960 |
| 3,007,293 | McGihon | Nov. 7, 1961 |
| 3,053,153 | Gilbert | Sept. 11, 1962 |